Aug. 5, 1958
R. G. HEDTKE
2,845,972
FORAGE CUTTER BLADE
Filed Oct. 18, 1954
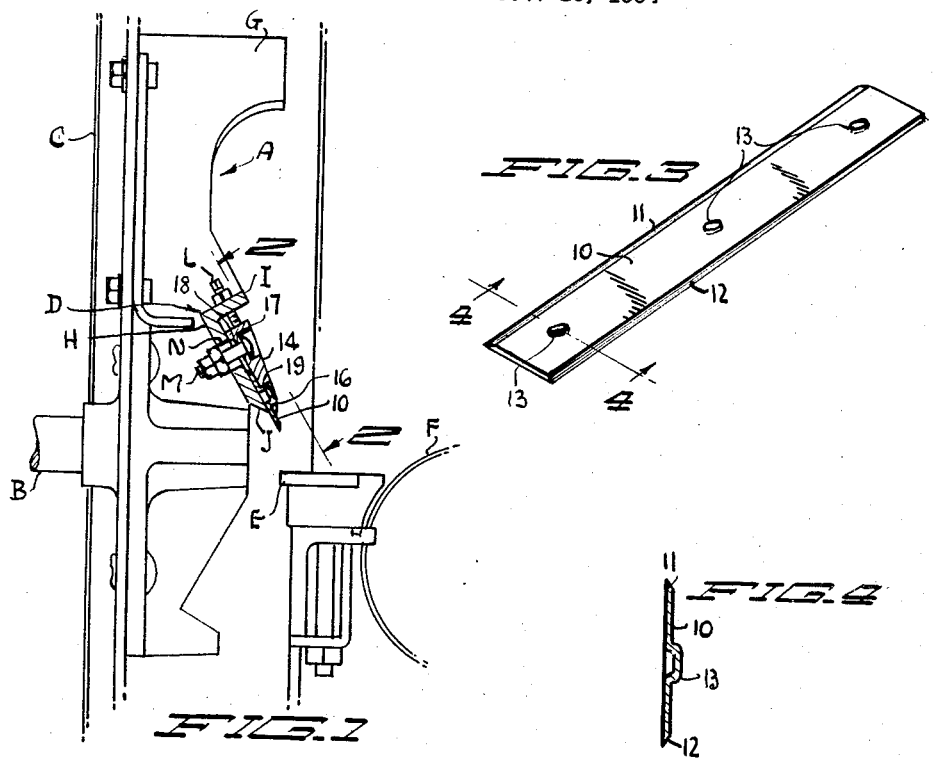
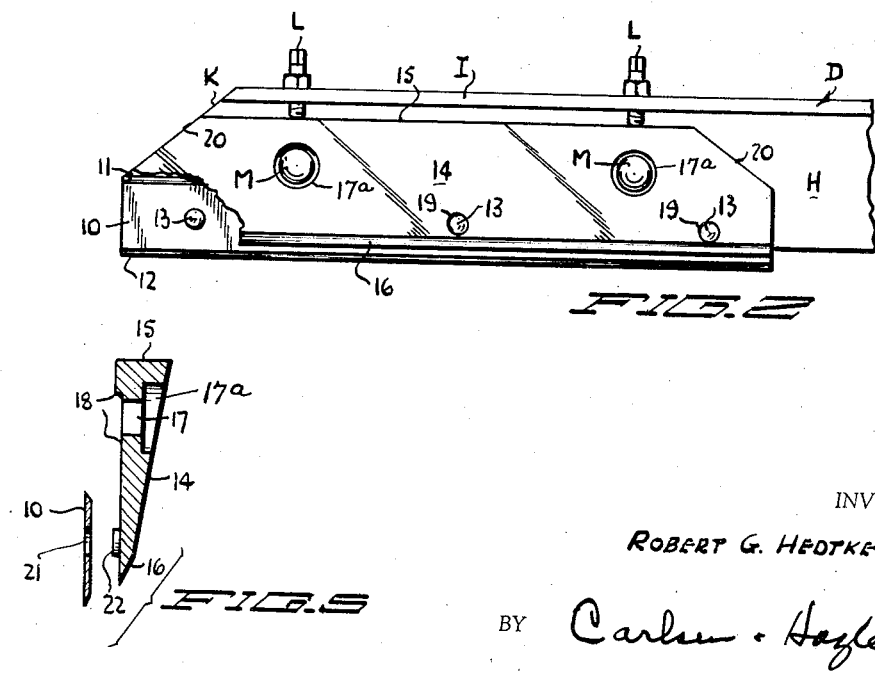
INVENTOR
ROBERT G. HEDTKE
BY Carlsen + Hoyle
ATTORNEYS

United States Patent Office 2,845,972
Patented Aug. 5, 1958

2,845,972
FORAGE CUTTER BLADE

Robert G. Hedtke, Excelsior, Minn., assignor to Minneapolis-Moline Company, Hopkins, Minn., a corporation of Minnesota Application October 18, 1954, Serial No. 462,740

2 Claims. (Cl. 146—108)

This invention relates generally to improvements in the cutters used for chopping up forage ensilage and like crop materials and more particularly to the blades for such cutters.

In the modern day forage cutter the crop material is fed to a rotary cutting wheel which includes a series of blade carriers or holders on which are adjustably mounted cutting blades or knives which move in a path past and cooperate with a stationary ledger or shear blade in order to chop the material up into ensilage. The cutting wheel is arranged in a fan housing and has fan blades which discharge the chopped crop material for collection and storage as required. The length of the individual pieces of crop material as chopped by the wheel is controlled by varying the rotational speed of the wheel in any suitable manner and, of course, the machine includes suitable crop gathering and feeding mechanisms to bring the crop material to the cutting wheel.

In the effort to make the actual cutting blades or knives stand up under the heavy service to which they are subjected in such machines it has heretofore been the custom to make the blades of heavy, properly tempered and sharpened steel but even so the fact that there are usually rocks, stones and the like in the crop material these blades become burred, chipped and otherwise dulled in just a few hours of average operation. Sharpening of the blades is quite expensive and to be done properly requires specialized equipment, in addition to which the blades must then be readjusted on their carriers in order to operate in proper shearing relationship with the ledger plate. All of these factors have added to the expense of operating such forage cutters and reduced the efficiency with which forage crops can be harvested with such equipment.

It is the primary object of my invention to provide a cutting blade which is made up from comparatively thin material, double edged and reversible on the blade carrier when one edge is dulled, and so inexpensive by comparison with present heavy blades that a worn blade may be replaced when both of its edges have been worn away much more cheaply in the long run. Further in accordance with this object I provide for backing up and securely holding such reversible double-edged blades a clamp member which may be secured to the blade carrier much in the same manner as the present heavy blades are mounted and which is strong enough to hold the thin blades in place while permitting them to be conveniently reversed when one edge has become worn.

Another object is to provide cooperating means on the reversible double-edged blade and clamp member for releasably holding the two against relative displacement so that they may be adjusted as a unit by the usual adjustment screws upon the blade carrier, just as the present heavy blades are adjusted.

These and other more detailed and specific objects will be disclosed in the course of the following specification, reference being had to the accompanying drawings, in which:

Fig. 1 is a fragmentary elevational view of the cutting wheel-blower fan and shear or ledger plate making up the chopping mechanism for a forage harvester, the cutter blade, clamp member and carrier being shown in section.

Fig. 2 is an enlarged elevational view of the cutter blade and clamp member of my invention, and outer part of the carrier, as viewed along the line 2—2 in Fig. 1.

Fig. 3 is a perspective view of the reversible double-edged cutter blade alone.

Fig. 4 is an enlarged cross sectional detail view of the blade along the line 4—4 in Fig. 3.

Fig. 5 is a composite cross sectional view of the cutter blade and clamp member of my invention, showing a modification.

Referring now more particularly and by reference characters to the drawing the cutting wheel-blower fan of a forage cutter is designated generally at A and is supported for rotation by a shaft B in a blower housing C. The wheel has a plurality of blade carriers or holders D, only one of which is here shown, which are adapted to carry the cutter blades as will be described past a ledger or shear plate E in order to chop forage crop material fed into the housing by a feed mechanism. Of the latter only a part of one feed roll F appears in Fig. 1. The element A also includes fan blades one of which appears at G and acts as a blower to deliver the chopped crop material from housing C for transport to a suitable storage facility (not shown).

The blade carrier D takes the form of a generally outwardly directed flat arm H having a flange I along one edge and its other edge beveled at J. Also the outer end of the arm, with reference to the center of the cutting wheel, is beveled off at one corner K (Fig. 2). A plurality of adjustment screws L are tapped through the flange I and in the ordinary instance heretofore a heavy cutter blade (not shown) having a beveled cutting edge is bolted to the arm H and adjusted by the screws L to pass in proper shearing relation to the ledger plate E as the cutting wheel rotates, thus chopping the forage crop material fed over the roller F onto the ledger plate as will be apparent. It will also be obvious that if stones and other hard objects are in the crop material, as is usually the case, the cutter blade is subjected to very severe shocks and wear, causing it to become chipped and burred to the point requiring removal, resharpening and readjustment in the machine after only a few hours of operation.

It will be noted that the bolts M for clamping the blade to the carrier are passed through slots N in the arm H to permit adjustment of the blade by the screws L in a well known manner.

In accordance with my invention I substitute for the heretofore used heavy cutter blade a blade 10 of light and compartively thin material, of elongated rectilinear shape with opposed beveled cutting edges 11 and 12. This blade is also formed between its ends with projecting bosses and teats 13 pressed from the material of the blade itself and, of course, the blade is suitably tempered. To hold this comparatively light weight and rather flexible blade firmly upon the carrier arm H, I then provide a heavy, stiff clamp member 14 substantially wider than the same length as the blade. This clamp member tapers, as viewed from its end, from what I will refer to as its back edge 15 to its thinner, beveled edge 16 and is provided with openings 17 to pass the aforesaid bolts M, with such openings counterbored as clearly shown at 17ª to receive the heads of these bolts. The face of the clamp member 14 next to the carrier arm H is cut away as at 18 to a depth sufficient to just receive the blade 10 and also the clamp member has openings or recesses 19 to nicely receive the bosses 13 on the blade. The opposite ends of the clamp member 14 are also beveled off at the corners 20 similar to the shape of the outer end of the carrier arm H.

The arrangement is such that the bolts M may be pulled tight and the clamp member 14 will hold the blade 10 firmly in place upon the carrier arm H, with only a narrow edge portion of the blade exposed and, of course, one of the beveled edges 11 or 12 is thus exposed to cooperate with the ledger plate E. The blade 10 is accurately located by its bosses 13 in the openings 19 and this engagement between blade and clamp member 14 prevents relative displacement of the two so that they may be adjusted as a unit by the screws L. The blade 10 is reversible and double edged and being quite inexpensive may be discarded when both of its edges are worn out and replaced by a new one. The heavier clamp member 14 is not subjected to wear to any great degree and may be used repeatedly. Withal the invention overcomes one of the considerable and expensive problems in such equipment as will be understood by those skilled in the art.

In Fig. 5 the blade 10 and clamp member 14 are exactly as heretofore described but in lieu of the bosses 13 the blade has openings 21 and the clamp member short studs or bosses 22 to enter these openings, this being a reversal of the previously described arrangement.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a forage cutter having a housing and a stationary shear plate therein, and a rotor journaled in the housing and having a blade carrier movable past said shear plate; the improvement comprising a blade of thin material positioned on said carrier and having longitudinal beveled edges selectively cooperable in shearing relation with said shear plate on reversing the blade on the carrier, a stiff clamp member for holding the blade to the carrier, adjustment means operatively arranged between the carrier and said clamp member for adjusting the blade with respect to said carrier, and the blade having openings and the clamp member short studs to fit into said openings to cause the blade and clamp member to move in unison as the adjustment means is adjusted.

2. In a forage cutter having a housing and a stationary shear plate therein, and a rotor journaled in the housing and having a blade carrier movable past said shear plate; the improvement comprising a blade of thin material positioned on said carrier and having longitudinal beveled edges selectively cooperable in shearing relation with said shear plate on reversing the blade on the carrier, a stiff clamp member having a face and an edge portion for holding the blade to the carrier, adjustment means operatively arranged between the carrier and said clamp member for adjusting the blade with respect to said carrier, and the said clamp member having a recess cut out in said face and through said edge portion to receive a part of the blade.

References Cited in the file of this patent

UNITED STATES PATENTS

| | | |
|---|---|---|
| 817,157 | Caldwell | Apr. 10, 1906 |
| 905,591 | Rowe | Dec. 1, 1908 |
| 949,542 | Levalley | Feb. 15, 1910 |
| 1,680,824 | Thompson | Aug. 14, 1928 |
| 1,903,183 | Jessup | Mar. 28, 1933 |
| 1,969,103 | Sheridan | Aug. 7, 1934 |
| 2,313,872 | Hill | Mar. 16, 1943 |